United States Patent [19]
Zimmerman

[11] 4,060,255
[45] Nov. 29, 1977

[54] WIDE RANGE BUMPER MOUNTED HITCH

[75] Inventor: Benjamin G. Zimmerman, Carlock, Ill.

[73] Assignee: Dennis Wettstein, Eureka, Ill.; a part interest

[21] Appl. No.: 667,375

[22] Filed: Mar. 16, 1976

[51] Int. Cl.² .............................................. B60D 1/00
[52] U.S. Cl. ............................. 280/478 R; 280/491 D
[58] Field of Search ............... 280/477, 478 R, 478 B, 280/491 R, 491 B, 491 D; 172/272, 677

[56] References Cited
U.S. PATENT DOCUMENTS

| | | | |
|---|---|---|---|
| 2,386,195 | 10/1945 | Clark | 280/477 |
| 3,147,027 | 9/1964 | Bronleewe | 280/478 R |

*Primary Examiner*—Robert R. Song
*Assistant Examiner*—John A. Pekar
*Attorney, Agent, or Firm*—Clarence A. O'Brien; Harvey B. Jacobson

[57] ABSTRACT

An elongated horizontal base member is provided for mounting in transverse position on one end of a towing vehicle. A pair of horizontal support arms have a first pair of corresponding ends thereof mounted on the base member, at points spaced therealong, for shifting along the base member and swinging relative to the base member about upstanding axes shiftable along the base member with the first pair of arm ends between first outwardly convergent positions and second substantially aligned positions generally paralleling the base member with the first pair of arm ends disposed remote from each other and the second other pair of arm ends disposed adjacent each other. A hitch member is provided to which the second other pair of ends of the arms are pivotally secured for angular displacement about upstanding axes and the hitch member and the base member include coacting releasable lock structure operative to lock the hitch member in position relative to the base member when the arms are disposed in the second positions thereof. Further, the base member and the first pair of ends of the arms include coacting structure whereby the arms and the hitch member supported from the second pair of arm ends will be automatically positioned, along the base member, in predetermined position when the arms are swung from the first positions thereof to the second positions thereof.

8 Claims, 6 Drawing Figures

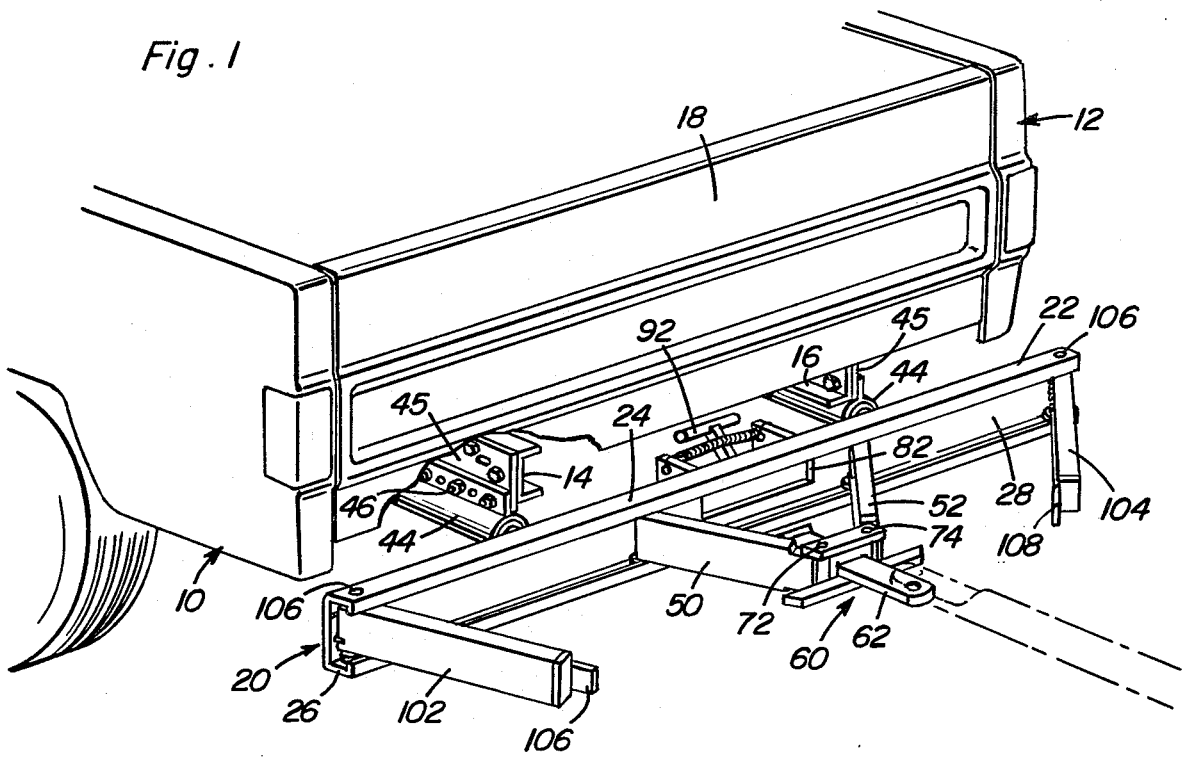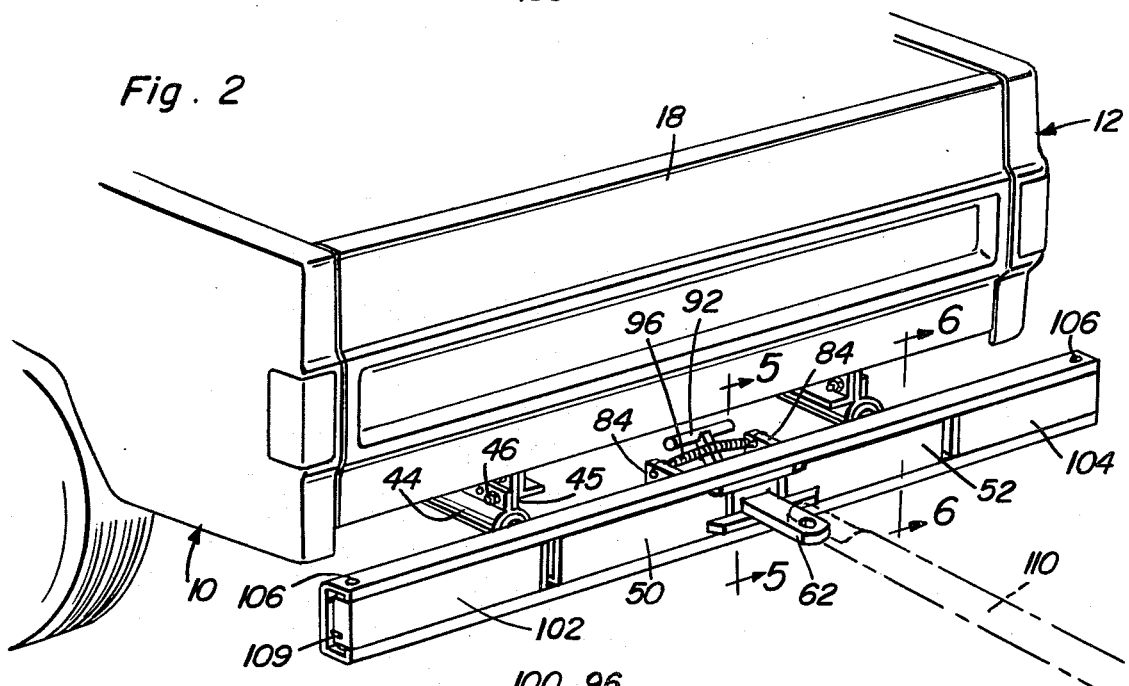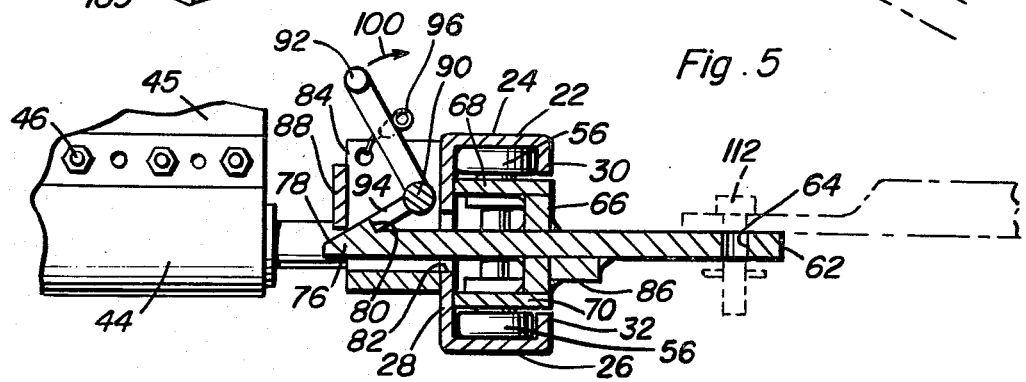

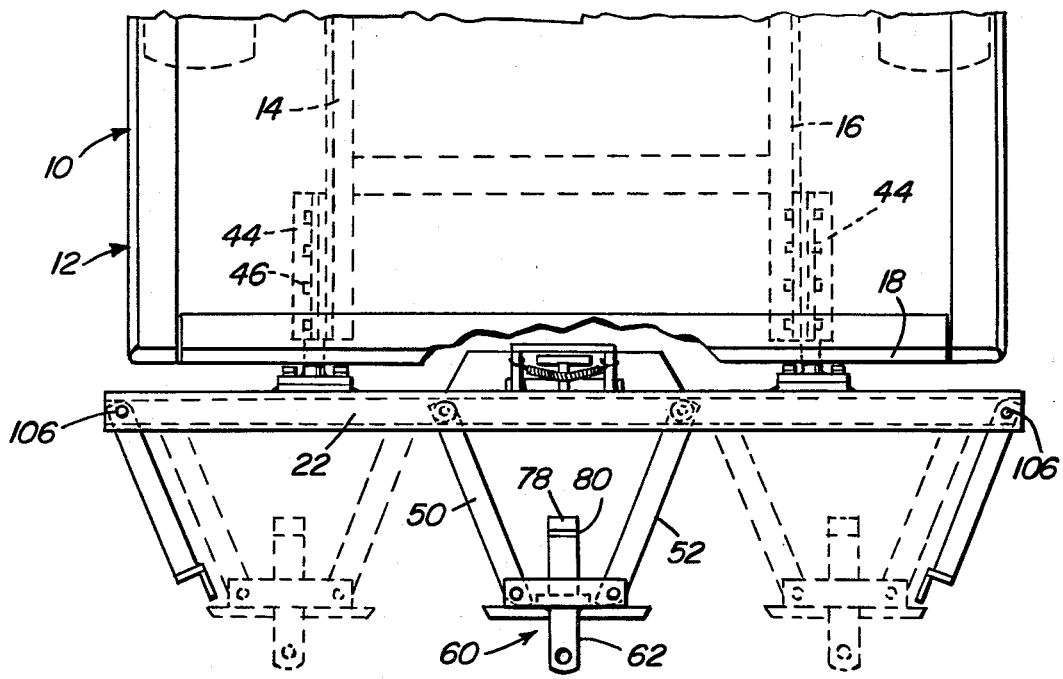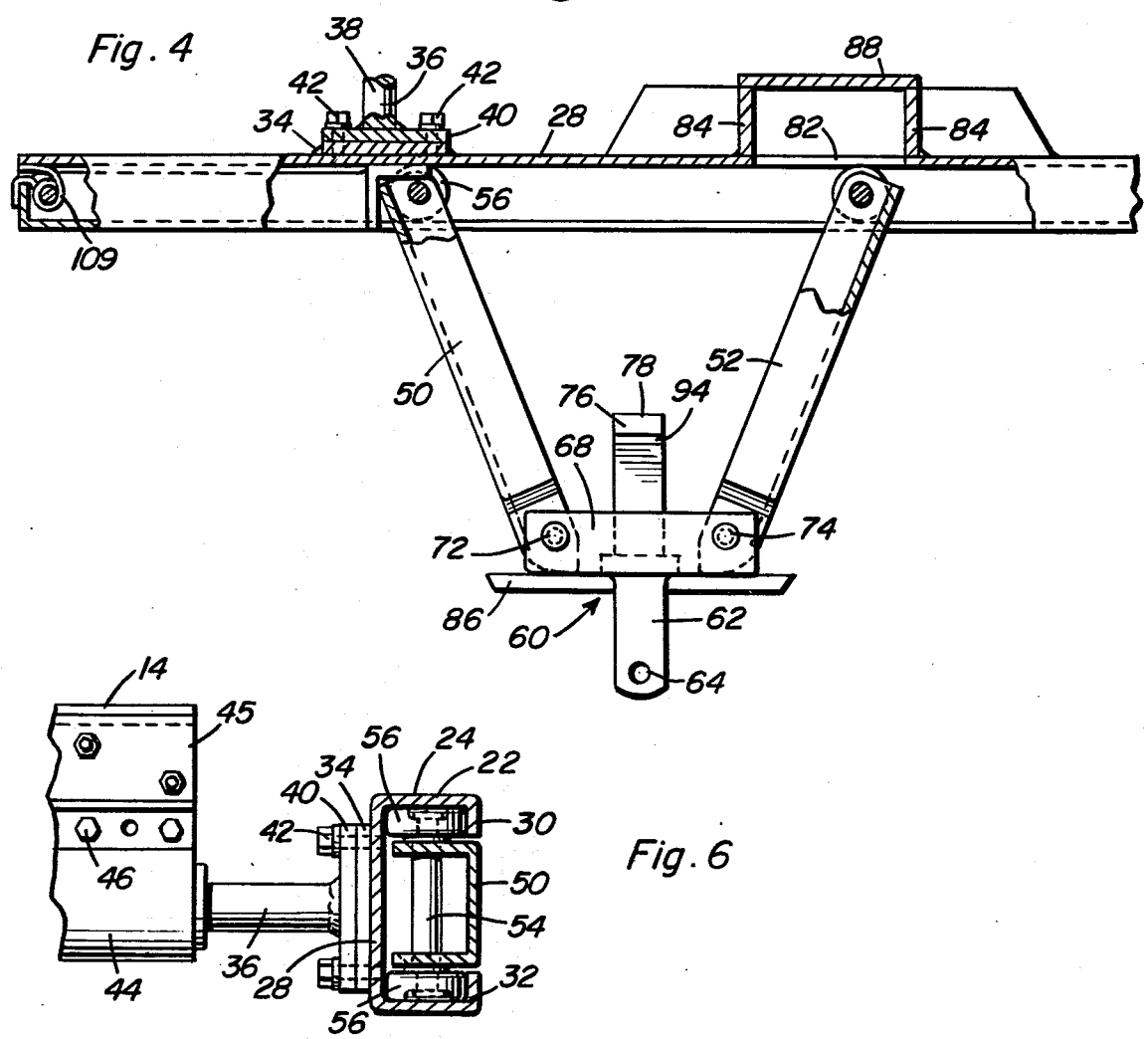

WIDE RANGE BUMPER MOUNTED HITCH

BACKGROUND OF THE INVENTION

Various forms of wide range bumper mounted hitches have been heretofore designed for the purpose of easing the task of hitching one vehicle to another. However, most wide range tow hitches either require special mounting structure or are not of a substantially fully retractable type.

Examples of previously patented tow hitches including some of the general structural and operational features of the instant invention are disclosed in U.S. Pat. Nos. 3,147,027, 3,419,285, 3,666,121, 3,704,900, 3,774,949 and 3,794,355.

BRIEF DESCRIPTION OF THE INVENTION

The wide range hitch of the instant invention is basically in the form of an elongated horizontal bumper member and may be used in lieu of a conventional bumper. The hitch includes a rearwardly extendable and laterally shiftable hitch member whereby the connection of a vehicle to be towed to the hitch member may be more readily accomplished and the rearwardly extendable hitch member may be thereafter forwardly retracted toward and releasably locked in a predetermined position. In addition, the elongated bumper defining horizontal base member of the wide range tow hitch includes mounting structure therefor whereby the base member may be supported from opposite side rail ends of a vehicle chassis frame in a shock absorbing manner.

The main object of this invention is to provide a wide range tow hitch including a rearwardly extendable and laterally displaceable hitch member for easing the task in coupling a vehicle to be towed to the hitch member.

Another object of this invention, in accordance with the immediately preceding object, is to provide a tow hitch including a rearwardly extendable and laterally shiftable hitch member which may automatically be locked in predetermined position upon forward retracting of the rearwardly extendable hitch member.

Another important object of this invention is to provide a wide range tow hitch with mounting structure therefor whereby the tow hitch may be supported from the frame rails of an associated vehicle in a shock absorbing manner and with the tow hitch being operable to serve the function of a bumper.

Yet another object of this invention is to provide a tow hitch in accordance with the preceding objects and which may be readily adapted for use on various different motor vehicles.

A final object of this invention to be specifically enummerated herein is to provide a wide range tow hitch in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary rear perspective view of a pickup truck with the wide range tow hitch assembly of the instant invention mounted on the truck in lieu of the conventional rear bumper thereof, the hitch member of the tow hitch being illustrated in a rearwardly displaced position for wide range shifting;

FIG. 2 is a fragmentary perspective view similar to FIG. 1 but with the rearwardly extendable and laterally shiftable hitch member in the forwardly retracted towing position thereof;

FIG. 3 is a fragmentary top plan view of the assemblage illustrated in FIG. 1 and with alternate wide range positions of the hitch element being illustrated in phantom lines;

FIG. 4 is a fragmentary top plan view of the right hand end portion of the tow hitch with the wide ranging hitch element thereof illustrated in an intermediate shifted position to the left and with parts of the hitch being broken away and illustrated in horizontal section;

FIG. 5 is a fragmentary vertical sectional view taken substantially upon the plane indicated by the section line 5—5 of FIG. 2; and FIG. 6 is a fragmentary vertical sectional view taken substantially upon the plane indicated by the section line 6—6 of FIG. 2.

DETAILED DESCRIPTION OF THE INVENTION

Referring now more specifically to the drawings, the numeral 10 generally designates a vehicle in the form of a pickup truck. The pickup truck 10 includes the usual load bed 12 supported from the opposite side longitudinal frame rails 14 and 16 of the chassis of the pickup truck 10. The rear of the load bed 12 is closed by means of the usual tail gate 18.

The wide range tow hitch of the instant invention is referred to in general by the reference numeral 20 and includes an elongated C-shaped channel member 22 defining a base member. The channel member 22 includes upper and lower flanges 24 and 26 interconnected along one pair of corresponding edge portions by means of an upstanding vertical flange 28 extending and secured therebetween. The longitudinal marginal edges of the flanges 24 and 26 remote from the flange 28 terminate in downwardly and upwardly directed vertically aligned flanges 30 and 32 whose free edges are disposed in vertically spaced relation.

Opposite end portions of the flange 28 have a pair of mounting plates 34 secured thereto and the free end portion 36 of a piston rod 38 is equipped with a mounting plate 40 secured to each mounting plate 34 by means of fasteners 42. The piston rods 38 are slidingly telescopingly received in mounting cylinder portions 44 secured to the frame rails or members 14 and 16 by means of universal mounting plates 45 and fasteners 46. Compression springs (not shown) are disposed in each mounting cylinder portion 44 and yieldingly bias the piston rods 38 to the rearmost displaced positions thereof illustrated in FIGS. 1 through 5. However, the compression springs yieldingly resist forward shifting of the piston rods 38 within the mounting cylinder portions 44.

It will of course be noted that the piston rods 38 and mounting cylinder portions 44 are parallel and extend longitudinally of the vehicle 10.

The hitch 20 includes a pair of channel-shaped support arms 50 and 52 including axle pins 54 secured through one pair of corresponding ends thereof. The ends of the axle pins 54 have wheels 56 journaled thereon and each pair of wheels 56 is captively received between the flanges 30 and 32 and the opposing portions of the flange 28. In this manner, the ends of the support arms 50 and 52 provide with the wheels 56 may shift longitudinally of the channel member 22 and also swing relative to the latter about the center axes of the axle pins 54.

The hitch 20 further includes a hitch member referred to in general by the reference numeral 60 and the latter includes an elongated hitch element 62 which is horizontally disposed and extends longitudinally of the vehicle 10. The hitch element 62 is apertured at its rear end as at 64 and extends through and is secured to an upstanding plate 66. The plate 66 is welded to the hitch element 62 centrally intermediate the opposite ends of the element 66 and upper and lower horizontal flanges 68 and 70 are secured to and project rearwardly from the upper and lower marginal portions of the plate 66. The ends of the support arms 50 and 52 remote from the axle pins 54 are pivotally supported between corresponding ends of the plates 68 and 70 as at 72 and 74 and the hitch element 62 projects forwardly of the plate 66 and terminates in a barb type end portion 76 including a forwardly and upwardly facing cam surface 78 and a rearwardly and upwardly facing abutment surface 80.

The central portion of the flange 28 has an opening 82 formed therethrough and a pair of rearwardly projecting upstanding plates 84 are secured to and project rearwardly from the flange 28 on opposite sides of the opening 82.

The hitch member 60 further includes a horizontal transverse abutment bar 86 secured to the underside of the hitch element 62 and the lower portion of the rear face of the plate 66. The forward end of the hitch element 62 is projectable rearwardly through the opening 82 and rearward penetration of the hitch element 62 through the opening 82 is limited by engagement of the opposite ends of the bar 86 with the adjacent ends of the support arms 52 when the latter are in the forwardly retracted substantially aligned positions illustrated in FIG. 2 of the drawings.

A strap member 88 extends between and is secured to the upper portions of the rear marginal edges of the plates 84 and thereby braces the latter. Further, a pivot shaft 90 is journaled between the plates 84 and includes an upwardly projecting T-shaped handle 92. In addition, the pivot shaft 90 includes a radially outwardly projecting abutment flange 94 and an elongated expansion spring 96 extends between and is connected to the plates 84. The spring 96 engages the handle 92 to bias the upper portion of the handle 92 in a forward direction.

Upon rearward insertion of the rear end of the hitch element 62 through the opening 82 the cam surface 78 abuts the flange 94 so as to cam the handle 92 in the direction of the arrow 100 in FIG. 5. Thus, the upper portion of the cam surface 78 passes beneath the free end of the flange 94 as the opposite ends of the bar 86 abut the adjacent ends of the arms 50 and 52. Thereafter, the tension of the springs 96 swings the handle 92 in a direction opposite to the arrow 100 so as to swing the abutment flange 92 downward behind the abutment surface 80 so as to prevent rearward displacement of the hitch element 62 relative to the channel member 22.

A pair of arms 102 and 104 have one pair of corresponding ends thereof pivotally supported from the opposite ends of the channel member 22 between the flanges 30 and 32 by means of pivot fasteners 106. The arms 102 and 104 are thus horizontally swingable and may be angularly displaced between positions substantially paralleling the channel member 22 and retracted in the opposite ends thereof (see FIG. 2) and rearwardly projecting positions such as those illustrated in FIGS. 1 and 3. The free ends of the arms 102 and 104 include locking flanges 106 and 108 which are closely abutted against the inner surface of the flange 28 when the arms 102 and 104 are swung to the positions thereof illustrated in FIGS. 2 and 3. Furthermore, the free ends of the arms 50 and 52 overlie the flanges 106 and 108 when the arms 102 are swung to the positions thereof illustrated in FIG. 2 and the hitch member 60 is forwardly retracted to the position thereof illustrated in FIG. 5 thereby retaining the arms 102 and 104 in the retracted positions. Also, the arms 102 and 104 are spring biased to the retracted positions thereof by means of springs 109.

In operation, when it is desired to rearwardly extend the hitch member 60 the handle 92 is pulled forwardly in the direction of the arrow 100 so as to elevate the abutment flange 94 above the abutment surface 80 after which the hitch member 60 may be rearwardly extended so as to withdraw the forward barbed end 76 of the hitch element 72 from the opening 82. As the hitch member 60 is rearwardly extended the arms 50 and 52 swing from the retracted positions thereof illustrated in FIG. 2 to the extended positions illustrated in FIGS. 1, 3 and 4. Thereafter, the arms 102 and 104 may be swung to the open positions thereof illustrated in FIGS. 1 and 3. Thereafter, the hitch member 60 may be shifted longitudinally of the channel member 22 between the phantom and solid line positions thereof illustrated in FIG. 3. After the forward end portion of a trailer tongue 110 or the like has been coupled to the hitch element 62 by means of any suitable fastener 112, the vehicle 10 may be moved forward slightly in a manner to ensure that the hitch member 60 is generally centered relative to the channel member 22. Thereafter, the arms 102 and 104 may be swung to the retracted positions thereof and the vehicle 10 may be operated in reverse thereby causing the hitch member 60 to be rearwardly displaced relative to the channel member 22. As the hitch member 60 is rearwardly displaced the roller or wheel-equipped ends of the arms 50 and 52 will move apart along the channel member 22 and abut the adjacent ends of the arms 102 and 104 and ride over the outer sides of the flanges 106 and 108. In addition, the forward end of the hitch element 62 will be forwardly projected through the opening 82 and the cam surface 78 will engage the flange 94 so as to cam the latter upwardly out of the way until such time as the spring 96 may swing the handle in a counterclockwise direction as illustrated in FIG. 5 of the drawings to again swing the flange 94 downwardly behind the abutment surface 80 thereby locking the hitch member 60 in the forwardly retracted position.

When the arms 50, 52, 102 and 104 are in the positions thereof illustrated in FIG. 2 of the drawings the abutting engagment of the remote ends of the arms 50 and 52 with the adjacent ends of the arms 102 and 104 prevent lateral shifting of the hitch member 60 relative to the vehicle 10 along the channel member 22. Of course, inasmuch as the piston rods 38 are spring mounted from the mounting cylinder portions 44 the entire wide range tow hitch 20 functions as a shock absorbing bumper.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated horizontal base member for mounting in transverse position on one end of a towing vehicle, a pair of horizontal support arms, one pair of corresponding ends of said support arms and said base member including coacting support means supporting said one pair of ends on said base member, at points spaced therealong, for shifting along said base member and horizontal swinging of said arms relative to said base member about upstanding axes shiftable along said base member with said one pair of arm ends between first outwardly convergent positions and second substantially aligned positions generally paralleling said base member with said one pair of arm ends disposed remote from each other and the other pair of arm ends disposed adjacent each other, said coacting support means including means supporting said support arms from said elongated base member against angular displacement of said arms about said base member during sliding and horizontal swinging movement of said support arms relative to said base member, and a hitch member to which said other pair of arm ends are pivotally secured, said hitch member and said base member including lock means operative to releasably lock said hitch member in position relative to said base member when said arms are disposed in said second positions thereof.

2. The combination of claim 1 wherein said hitch means includes a horizontally disposed short elongated member to whose opposite end portions said other pair of ends of said support arms are pivotally secured in horizontally spaced apart relation and including an elongated horizontal hitch element disposed at generally right angles relative to said short elongated member.

3. In combination, an elongated horizontal base member for mounting in transverse position on one end of a towing vehicle, a pair of horizontal support arms having one pair of corresponding ends on said base member, at points spaced therealong, for shifting along said base member and horizontal swinging relative to said base member about upstanding axes shiftable along said base member with said one pair of arm ends between first outwardly convergent positions and second substantially aligned positions generally paralleling said base member with said one pair of arm ends disposed remote from each other and the other pair of arm ends disposed adjacent each other, and a hitch member to which said pair of arm ends are pivotally secured, said hitch member and said base member including coacting lock means operative to releasably lock said hitch member in position relative to said base member when said arms are disposed in said second positions thereof, said base member and arms including deactivatable means operative, when activated, to limit shifting movement of said one pair of ends of said arms along said base member toward the corresponding ends thereof when said arms are in said first position, and operable to prevent shifting of said one pair of arm ends along said base member when said arms are in said second positions, said deactivatable means comprising a pair of abutment arms pivotally supported at one pair of ends thereof from the opposite end portions of said base member for horizontal swinging between open positions with the other pair of ends of said abutment arms projecting outwardly of said base member and closed generally aligned positions with said other pair of ends of said abutment arms swung inwardly toward said base member and toward each other, said other pair of ends of said abutment arms, when the latter are in said closed positions being abuttable by said one pair of ends of said support arms to limit shifting of the latter toward the corresponding ends of said support member.

4. The combination of claim 3 wherein said other pair of ends of said abutment arms and said one pair of ends of said support arms include coacting means, when said abutment arms are in said closed positions and said support arms are in said second positions, retaining said abutment arms in said closed positions thereof.

5. The combination of claim 4 including means yieldingly biasing said abutment arms toward their closed positions.

6. An improved tow bar for vehicles comprising, in combination:
   a. a horizontal base member with an inside and an outside, said outside including an elongated horizontal channel;
   b. means for attaching the base member to a vehicle;
   c. first and second horizontal pivot arms, each arm having an outside end and an inside end, said arms slidably and pivotally mounted at their outside ends in the channel;
   d. hitch means pivotally connected to the inside ends of the pivot arms;
   e. releasable latch means in the base member for engaging and holding the hitch means in fixed position relative to the channel; and
   f. abutment means at the opposite ends of the channel to maintain the slidable pivot arms and hitch means in the channel.

7. In combination, an elongated horizontal channel member including an open outer side and an inner side, means for attaching said channel member to a vehicle, a collapsible tow bar structure including first and second support arms, mounting means pivotally and slidably mounting one pair of corresponding ends of said arms in said channel member for horizontal swinging of the other pair of arm ends relative to said channel member and sliding movement of said one pair of ends of said arms along said channel member, means pivotally connecting the other pair of arm ends, hitch means and first latch means carried by said tow bar structure adjacent said other pair of arm ends, said arms being substantially completely receivable within said channel member in stored positions therein generally paralleling said channel member and said arms being slidable and horizontally swingable relative to said channel member with said other pair of ends of said arms displaced outwardly through the open side of said channel member and outwardly converging therefrom, said channel member including second latch means, said first and second latch means being operable, when said arms in said stored positions, to releasably latch said arms in said stored position against swinging movement of the other pair of arm ends outwardly through the open outer side of said channel member.

8. The combination of claim 7 wherein said mounting means includes means mounting said one pair of ends of said arms from said channel member against angular displacement of said arms relative to said channel member about an axis generally paralleling said channel member throughout horizontal swinging and sliding of said support arms relative to said channel member.

* * * * *